United States Patent
Elfström et al.

(10) Patent No.: US 9,648,636 B2
(45) Date of Patent: May 9, 2017

(54) INTELLIGENT M2M ENERGY OPTIMIZATION ALGORITHM

(71) Applicant: Telefonaktiebolaget LM Ericsson (publ), Stockholm (SE)

(72) Inventors: Torbjörn Elfström, Fjärås (SE); Pankaj Gupta, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/443,208

(22) PCT Filed: Dec. 10, 2012

(86) PCT No.: PCT/EP2012/074895
§ 371 (c)(1),
(2) Date: May 15, 2015

(87) PCT Pub. No.: WO2014/090269
PCT Pub. Date: Jun. 19, 2014

(65) Prior Publication Data
US 2015/0305054 A1    Oct. 22, 2015

(51) Int. Cl.
*H04W 72/00* (2009.01)
*H04W 72/12* (2009.01)
*H04W 52/02* (2009.01)
*H04W 4/00* (2009.01)

(52) U.S. Cl.
CPC ....... *H04W 72/1226* (2013.01); *H04W 4/005* (2013.01); *H04W 52/0261* (2013.01); *Y02B 60/50* (2013.01)

(58) Field of Classification Search
CPC ............. H04W 72/1226; H04W 4/005; H04W 52/0261; Y02B 60/50
USPC ........................................ 455/452.1; 370/338
See application file for complete search history.

(56) References Cited

U.S. PATENT DOCUMENTS

| | | | |
|---|---|---|---|
| 2005/0163088 A1* | 7/2005 | Yamano | H04W 28/18 370/338 |
| 2008/0130557 A1* | 6/2008 | Kuchibhotla | H04L 1/0031 370/329 |
| 2012/0163263 A1* | 6/2012 | Oh | H04W 52/0216 370/311 |

(Continued)

OTHER PUBLICATIONS

International Search Report and Written Opinion dated Sep. 19, 2013 for International Application Serial No. PCT/EP2012/074895, International Filing Date—Dec. 10, 2012 consisting of 5-pages.

*Primary Examiner* — Marcos Batista
(74) *Attorney, Agent, or Firm* — Christopher & Weisberg, P.A.

(57) ABSTRACT

The invention provides for a method for power optimized transmission scheduling in an energy harvesting machine to machine device, comprising an internal power storage and an internal energy harvesting source and being configured for communication with a mobile communications network via a wireless link. The method comprises receiving an event triggering a decision to send data to the mobile communications network, monitoring at least one power parameter of said internal power source and scheduling said data for transmission based on the at least one power parameter. The invention also relates to a corresponding M2M device, to a network node and to a computer program for performing the method.

17 Claims, 5 Drawing Sheets

(56) References Cited

U.S. PATENT DOCUMENTS

2012/0210325 A1    8/2012  de Lind van Wijngaarden et al.
2014/0036877 A1*  2/2014  Campbell ............ H04W 72/10
                                                    370/336

* cited by examiner

INTELLIGENT M2M ENERGY OPTIMIZATION ALGORITHM

TECHNICAL FIELD

The present invention relates to the field of Machine to Machine, M2M, devices and in particular it relates to energy harvesting M2M devices, and to a method for power optimized transmission scheduling in an energy harvesting machine to machine device. The invention also relates to a corresponding M2M device and to a network node.

BACKGROUND

Machine to machine, M2M, communication over mobile and wireless networks is expected to become increasingly important in the future. Examples of possible M2M applications are almost countless e.g. in private cars for communicating service needs, in water or electricity meters for remote control and/or remote meter reading, in street-side vending machines for communicating when goods are out-of-stock or when enough coins are present to justify a visit for emptying, in taxi cars for validating credit cards, in surveillance cameras for home or corporate security purposes, in containers in a transport system etc.

An M2M device may be mounted at places with severely low accessibility in tough environments limiting occasion for battery exchanges and re-charging.

Hence, a mobile M2M device equipped with a modem for transporting data via a cellular network requires long battery lifetime, often without main power supply available. The device may rely on its own power supply, as is the normal case for asset tracking devices and sensor devices. For several types of devices, a battery is not a self-sufficient power source. To extend operation time of the device energy harvesting may be used to complement the internal battery. The energy harvesting can be based on extracting energy from ambient sources such as vibrations, solar energy and temperature gradient. However, sometimes energy cannot be continuously harvested and a device may run out of power. Today, such a device will be deemed switched off, meaning that it will be completely detached. So, when the device comes back after harvesting enough energy, there will be a signaling penalty associated with attach, followed by Packet Data Protocol, PDP context activation.

Currently, there are no intelligent power saving algorithms for M2M devices that are able to harvest their own energy. M2M devices are pre-programmed to access the network for sending or receiving data, or they are accessed in the downlink from the network. The output power of a mobile entity in a mobile communications network is determined by the base station e.g. a Node B. As a consequence, a method for power saving in a machine to machine device which is e.g. placed geographically out of range of manual service is desirable.

SUMMARY

Intelligent M2M devices that are capable of harvesting energy from ambient sources provide opportunity for optimization of energy consumption. The idea of the present invention is a new approach where the device itself decides to reschedule data transmission to conserve energy. Hence, according to the present invention, the device will have a power budget defined under the specific conditions in which it is expected to operate.

With the above description in mind, then, an aspect of the present invention is to provide a method for authenticating devices in a mobile communication network, which seeks to mitigate, alleviate, or eliminate one or more of the above-identified deficiencies in the art and disadvantages singly or in any combination.

The present invention is defined by the appended independent claims. Various advantageous embodiments of the invention are set forth by the appended dependent claims as well as by the following description and the accompanying drawings.

One aspect of the invention provides for a method for power optimized transmission scheduling in an energy harvesting machine to machine device, comprising an internal power storage and an internal energy harvesting source. The device is further configured for communication with a mobile communications network via a wireless link. The method comprises: receiving an event which triggers a decision to send data to the mobile communications network, monitoring at least one power parameter of said internal power source and scheduling data for transmission based on the at least one power parameter.

According to one aspect of the invention the method further comprises monitoring at least one link quality parameter of said wireless link. The scheduling is then further based on the at least one link quality parameter.

Another aspect of the invention relates to a machine to machine device comprising a network communication unit configured to communicate with a mobile communication network over a wireless link, an internal power storage and an internal energy harvesting source, a monitor configured to monitor at least one power parameter of the internal power storage and a processor unit configured to receive an event triggering a decision to send data to the mobile communications network. The processor unit is further configured to schedule the data for transmission to the mobile communication network based on the at least one power parameter of said internal power storage.

Another aspect of the invention relates to a network node in a mobile communications system comprising a network communication unit configured to communicate with a mobile communication network over a wireless link, an internal data storage configured to store a classification of a device communicating with said mobile communication network, a processor unit configured to receive a signal from an attached device using said network communication unit, wherein said signal comprises a classification of the device as being an energy harvesting machine to machine device. The processor unit is further configured to store said classification in the internal data storage.

Another aspect of the invention relates to a computer program product comprising instructions that when executed by a processing unit in a machine to machine device, forces the machine to machine device to perform the method steps defined in the method described above.

With the above description in mind, the object of the present invention is to overcome at least some of the disadvantages of known technology as described previously.

BRIEF DESCRIPTION OF THE DRAWINGS

The present invention will be more readily understood through the study of the following detailed description of the embodiments/aspects together with the accompanying drawings, of which.

It should be added that the following description of the embodiments is for illustration purposes only and should not be interpreted as limiting the invention exclusively to these embodiments/aspects.

DETAILED DESCRIPTION

The various steps described below in connection with the figures should be primarily understood in a logical sense, while each step may involve the communication of one or more specific messages depending on the implementation and protocols used. The shown units are also to be understood logically without limitation to possible implementation in practice.

The general concept of the present invention is a new approach where the M2M device itself controls transmission scheduling in order to conserve energy. Scheduling implies scheduling data for transmission immediately, later or not at all.

A wireless M2M device is equipped with a radio modem. The power amplifier, PA, as part of the modem is one of the largest power consumers of the M2M device. The power consumption is correlated with the output radio power generated by the PA. In cellular networks e.g. GSM, WCDMA and LTE, the output power is determined by the base station. For GSM, WCDMA and LTE the mobile entities, ME, in a network are categorized for certain output power classes defined in 3GPP RF core specifications (for WCDMA TS 25.101 [1], section 6.2.1 defines power classes with corresponding RF level ranges). As the modem is one of the largest power consumers of a wireless M2M device it is desirable to minimize the modem, including the PA, power dissipation.

A M2M device referred to in this application could be any machine device capable of communicating with a mobile communications network. Examples of such devices are mentioned in the background description, but are not limited thereto.

An embodiment of the invention will now be described in a wireless wide area network. However, embodiments of the invention are implemented to a mobile communication network using Wireless Local Area Network, WLAN (e.g. 802.11a, b, g, n) or Wireless Personal Area Network, WPAN.

Figure 1:
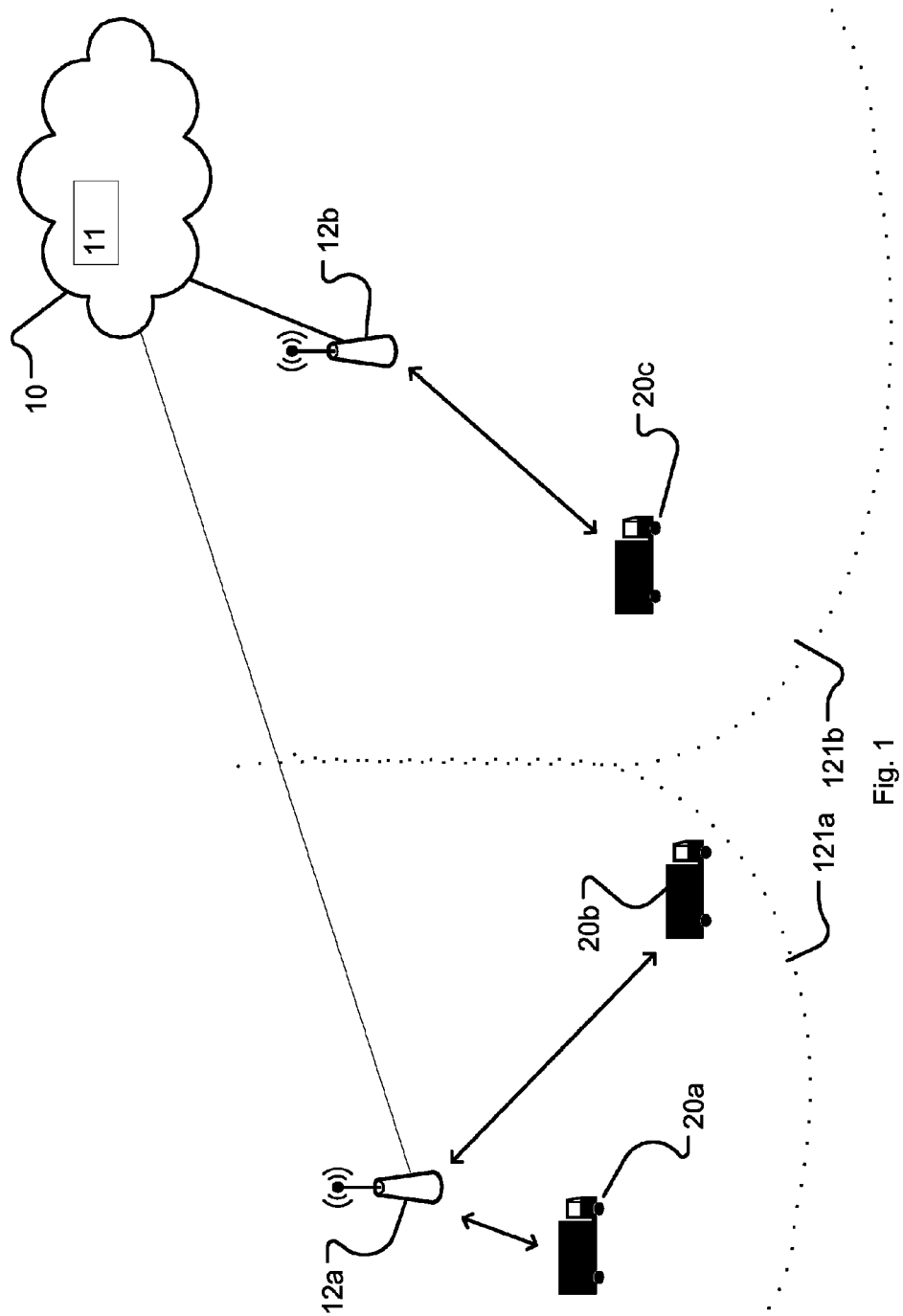
FIG. 1 schematically illustrates a mobile communication network with energy harvesting M2M devices.

FIG. 1 illustrates schematically a mobile communication network 10, where the method for power optimized transmission scheduling in an energy harvesting machine to machine device, according to one aspect of the invention, is be implemented. The mobile communication network is any type of public network providing any services to a mobile entity involving a connection and the communication of signals and data, such as a mobile access network using, e.g., GSM, UMTS, GPRS or LTE standards or a short range network as WLAN or WPAN.

For simplicity this illustration only discloses two base stations 12a, 12b. Each base station defines a cell 121a, 121b, respectively. A number of energy harvesting machine to machine devices 20a, 20b and 20c are connected to the mobile communications network 10.

Figure 2:
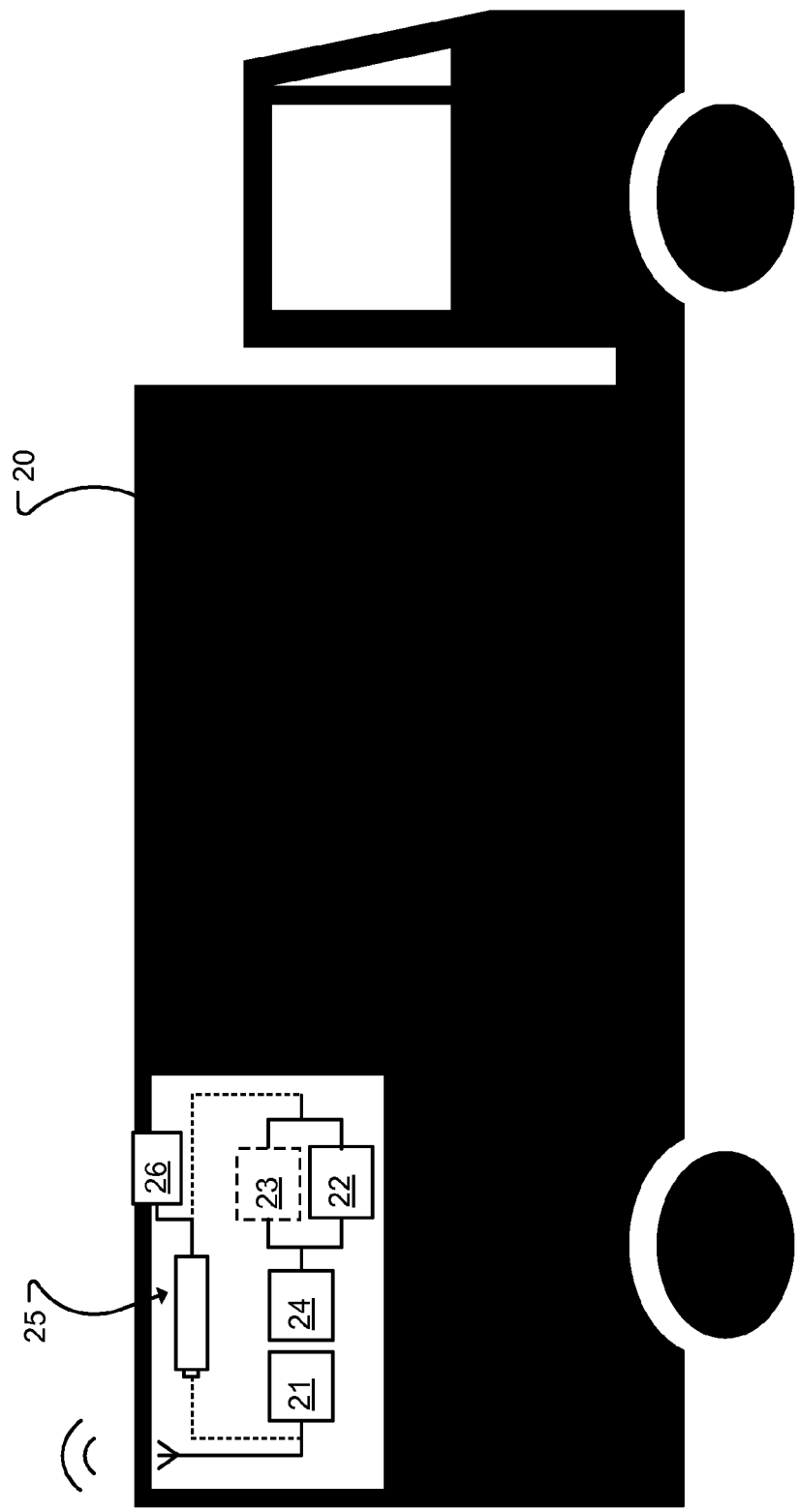
FIG. 2 discloses an energy harvesting M2M device.

FIG. 2 discloses an energy harvesting M2M device 20, in this case a truck. The M2M device 20 comprises a network communication unit 21, two monitors 22, 23, an internal power storage 25, a processor unit 24 and an energy harvesting source 26. These components are e.g. comprised in a Wireless Wide area network, WWAN, module attached to the truck.

The network communication unit 21, is configured to communicate with a mobile communication network 10 over a wireless link. The network communication unit comprises a modem including at least a radio circuit and power amplifiers.

The internal power storage 25 is e.g. a battery or a capacitor. In this embodiment it is a battery 20. The battery is configured at least to power the network communication unit 21. The internal power storage 25 is chargeable using an energy harvesting source. The energy harvesting source is internal, i.e. located within or in connection to the M2M device 20.

The internal energy harvesting source 26 extracts energy from ambient sources such as vibrations, solar energy and temperature gradient. The internal energy harvesting source 26 is connected to the internal power storage 25, here the battery. The battery is charged with the harvested energy.

The monitor 22 is configured to monitor at least one power parameter of the internal power storage 25.

The monitor may be adapted to monitor power storage level, i.e. the voltage of the battery. According to one aspect of the invention, the monitor is further adapted to monitor the current power consumption e.g. the power consumption of the network communication unit 21. It may also be the power consumption of two or more components.

According to one aspect of the invention, the monitor is further adapted to monitor power storage leakage. Power leakage is defined as the decrease of energy in the battery, when no current is drawn from the battery. Leakage varies by battery charge level, temperature and time i.e. age of the battery.

Specific parameters, which can affect power consumption of the M2M device while communicating with the network, are in GSM: Received Signal Strength Indicator RSSI, Received quality, RX_Qual, Bit Error Rate, BER, Block Error Rate, BLER. In 3G the corresponding parameters are RSSI, Mean Bit Error Probability, Mean_BEP, Coefficient of Variance of the Bit Error Probability, CV_BEP, BER and BLER.

In LTE Reference Signal Received Power, RSRP, Reference Signal Received Quality, RSRQ and RSSI are the measurements that the ME takes for cell reselection or handover purposes. It is not used for the purposes of the transmission settings but to take the decision (by the ME—in case of cell reselection; or evolved Node B—in case of handover) to move the ME to other cell.

The measurements and feedback that relate to the transmission settings are known as Channel Quality Indicator, CQI. For an LTE receiver parameters such as RSRP, RSRQ, RSSI and SINR are of great importance. The use of these parameters could be extended to also estimate the power budget and to select appropriate output power fulfilling the device energy budget.

The description of RSRP, RSRQ and RSSI is given in the 3GPP specification TS 36.214 [3] and the use of them i.e. measurement settings and reporting in the RRC spec. (3GPP specification TS 36.331).

The description of CQI is given in the 3GPP specification TS 36.213.

According to one aspect of the invention, the device is configured to monitor these parameters in order to assess the need to move to a power saving mode.

Hence, according to one aspect of the invention, it comprises a monitor 23 adapted to monitor at least one link quality parameter of said wireless link. In FIG. 2 this is a separate monitor 23. According to one aspect of the invention it comprises one monitor monitoring both a power parameter and a link quality parameter. The link quality parameter may be Serving Cell SNR, Serving Cell RSSI, Timing Advance, neighbor cell information, device motion, and topography or cell conditions.

The processor unit 24 is configured to receive an event triggering a decision to send data to the mobile communications network. The processor is further configured to schedule said data for transmission to the mobile communication network 10 based on the at least one power parameter of said internal power storage 25.

If the energy harvesting M2M device 20 comprises a monitor 23 for measuring a link quality parameter, the processor unit 24 is further configured to schedule data for transmission to the mobile communication network 10 based on the at least one link quality parameter of said wireless link.

In more general terms, the M2M device will have a power budget defined under specific conditions in which it is expected to operate. For example, a WWAN module under idle mode consumes about 9.9 mJ of energy. Under the typical scenarios of the M2M application, the WWAN module will be expected to go to connected mode, transfer/receive data and switch back to idle mode. Under extreme conditions, the device may be designed to keep the WWAN module switched off, thus reducing a drain of power considerably. This power budget is calculated as part of system design of the M2M device and needs to be balanced with the energy stored in the device inside the battery. If the device has integrated energy harvesting technology, it may also mean that enough energy has been harvested for the specific usage the device wants to execute, such as sending a report.

For example, when the M2M device calculates that the harvested energy will not be enough, it can report this status to the network as an "out of power" signal. The status may indicate that in the close future the M2M device may possibly not monitor paging channels at the same rate or that the device will be forced to shut down indefinitely until sufficient energy has been harvested. When the energy balance becomes appropriate, it starts normal operation again.

The processor unit 24 may further be adapted to perform all the method steps as disclosed in relation to FIGS. 3 and 4 below.

The method for power optimized transmission scheduling by a device will now be described in further detail with reference to FIG. 3.

Figure 3:
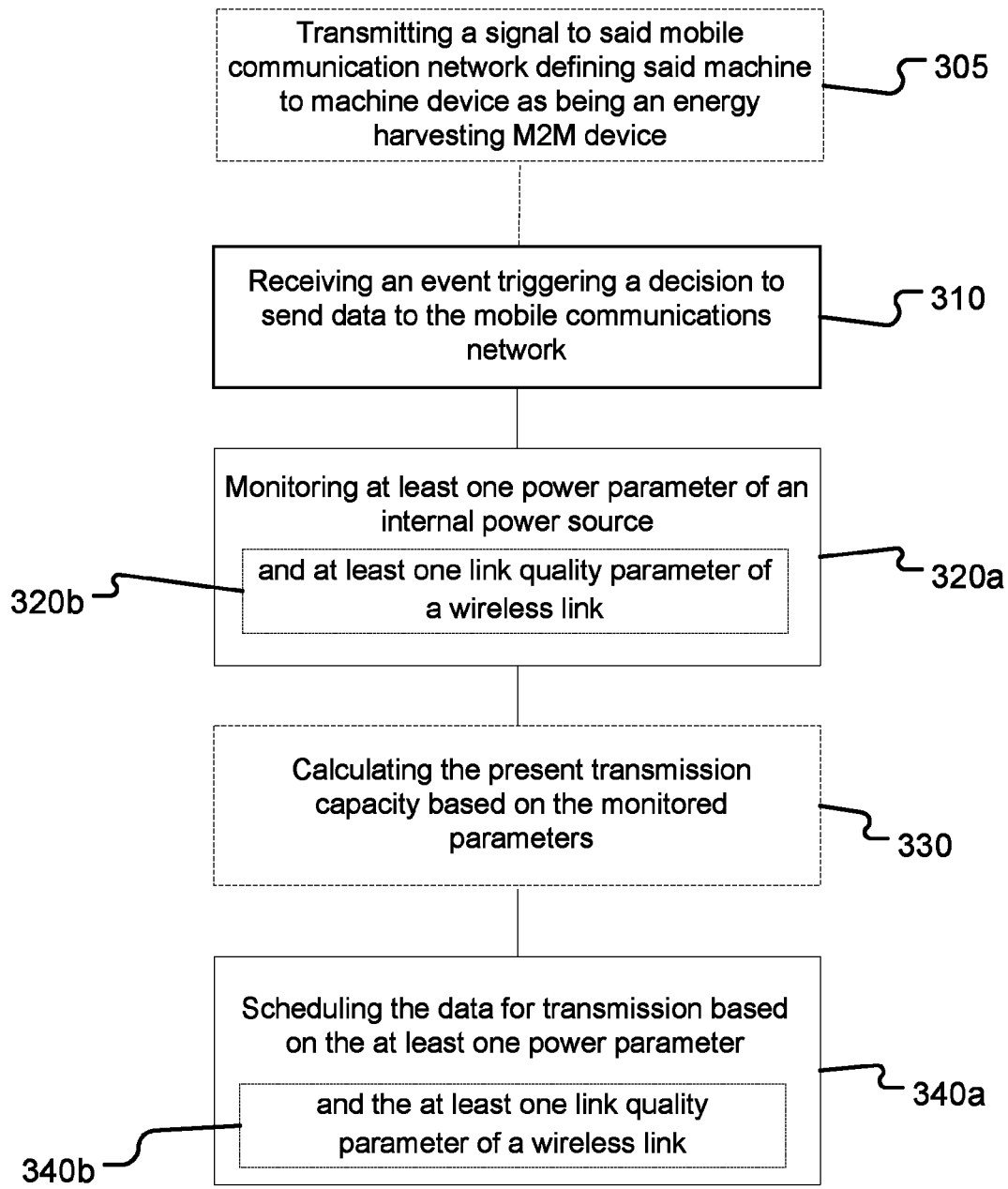
FIG. 3 illustrates the method for power optimized transmission scheduling in an energy harvesting machine to machine device in a flow chart.
Figure 4:
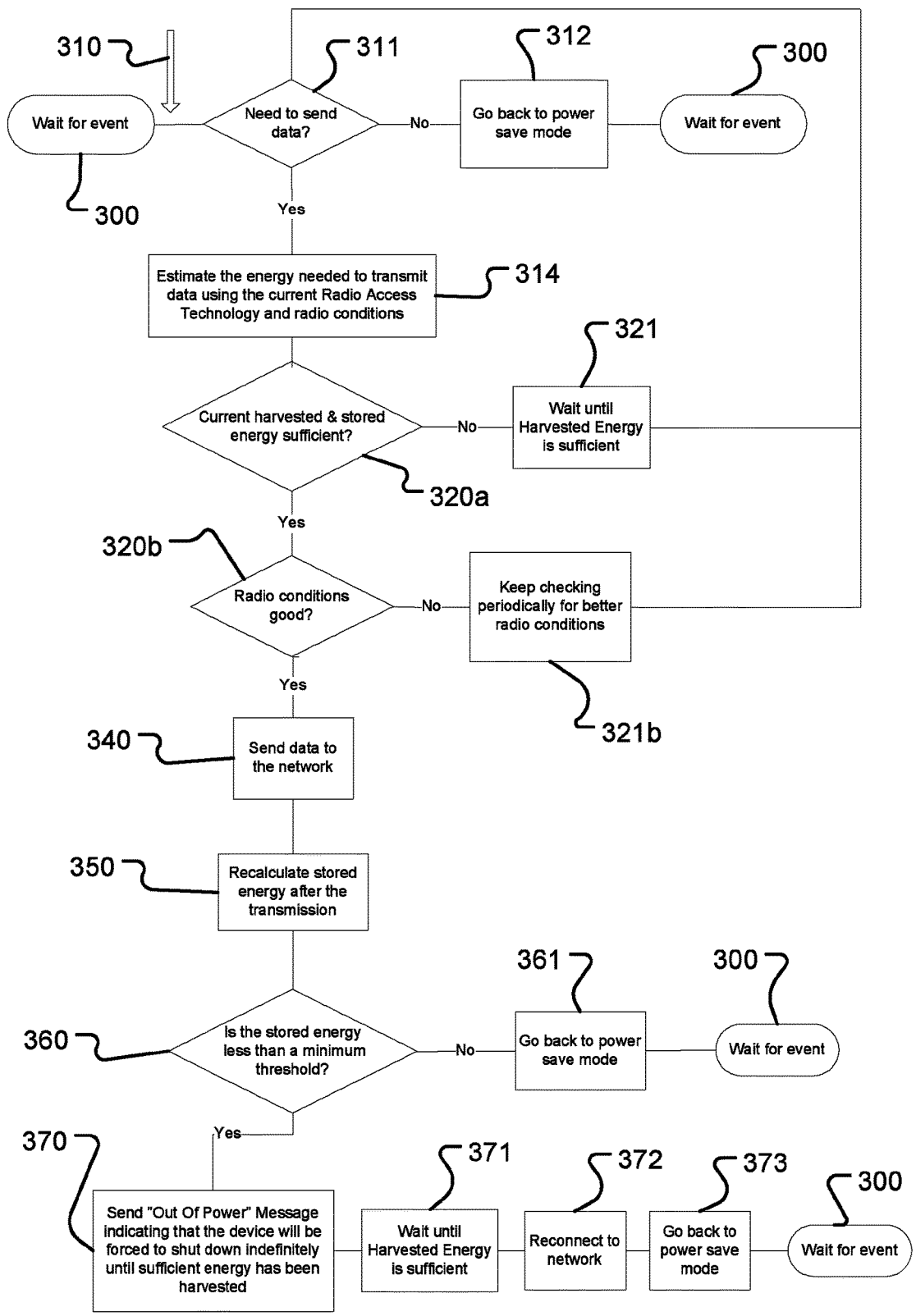
FIG. 4 illustrates a method for power optimized transmission scheduling in an energy harvesting machine to machine device according to one embodiment of the invention.

FIG. 3 illustrates a method for power optimized transmission scheduling in an energy harvesting machine to machine device. The machine to machine (M2M) device comprises an internal power storage and an internal energy harvesting source and is further configured for communication with a mobile communications network via a wireless link.

As an optional first step, the M2M device transmits 305 a signal to said mobile communication network, comprising a parameter defining said machine to machine device as being an energy harvesting machine to machine device. Thereby, the mobile communication network knows that the device is an energy harvesting machine to machine device and may adapt its behavior thereafter. The parameter may e.g. be the MS Classmark, Mobile Station Classmark, which may be extended in order to include the device type. A proposed way of extending the MS Classmark in order to categorizing devices is described in table 1. The Section 10.5.1.7 in 3GPP TS 24.008 and TS 44.018 contains the description of MS Classmark 3. The Figure 10.5.7 is then updated with this new definition of capabilities as specified in the following table.

MS Classmark 3 extension could be included in the spare bits at the end of the message described in Figure 10.5.7 of the standard.

TABLE 1

| SNo | Class | Classmark 3 extension | Description |
| --- | --- | --- | --- |
| 1 | A | 00 | H2M Mobile phone with voice as the primary capability |
| 2 | B | 01 | H2M Handheld devices with data as the primary capability |
| 3 | C | 10 | M2M stationary devices with no constraint on power |
| 4 | D | 11 | Energy Harvesting capable devices: M2M devices with energy harvesting capability, intermittent data transfer, non-deterministic availability of energy |

By using this classification, the Node B scheduler may utilize this information to e.g. optimize allocation of resources.

In the next step the M2M device receives 310 an event triggering a decision to send data to the mobile communications network. This event is either an internal event occurring periodically or an external event such as a sensor value indicating e.g. a temperature increase. Further examples of events are Built In Self Test, BIST, transition to good radio conditions, change in harvested energy and so on.

In the next step the M2M device monitors 320a, in said machine to machine device, at least one power parameter of said internal power source 25. The power parameter may, as described before, be the power level of the internal power source 25 at this moment. The power parameter may also be the current drawn from or the present charge level of the internal power source 25.

Then the M2M device schedules 340a the data, triggered by the event, for transmission based on the at least one power parameter. This implies that based on the parameter value, the M2M device takes a decision on whether to send, postpone or discard this data. This is done in different ways. One implementation showing how the power parameter value may be used is disclosed is disclosed in FIG. 4.

As an option, the method for power optimized transmission scheduling may further comprise that the M2M device monitors 320b at least one link quality parameter of the wireless link. The link quality parameter may be Serving Cell SNR, Serving Cell RSSI, Timing Advance, neighbor cell information, device motion, topography and cell conditions. Then the scheduling 340b of the data, is further based on the at least one link quality parameter. By using a link quality parameter, it is possible to delay transmission if link quality is very poor, because transmission under such conditions requires a high transmission power and may even require several retransmissions. A M2M device knowing that its power source is getting low may thus choose to delay a transmission until the link quality gets better.

The method may further comprise monitoring movement or velocity. This may be done by monitoring a GPS parameter or cell id change. The transmission scheduling may further be based on movement or velocity. For example if the link quality is very bad and the M2M device receives information indicating that the M2M device is moving, then it may choose to wait until link quality is better.

The device may e.g. realize that it is very close to a link border, where a high transmission effect is required. Then the M2M device may select to delay the transmission until it is closer to a base station in order to save power.

According to one aspect of the invention, the scheduling 340a, 340b is based on the present transmission capacity calculated 330 using said at least one link quality and said at least one power parameter. This may be done by monitoring the link quality, e.g. SNR, and the power level of the internal power source 25. The M2M device then comprises information about how much energy is required to transmit a certain amount of data, provided certain link conditions. This knowledge may be preprogrammed in the M2M device.

According to one aspect of the invention it further comprises scheduling signalling data for transmission, based on the at least one link quality and/or said at least one power parameter. Examples of signalling data is periodic measurement reports.

Then signalling data and device data, triggered by the event are e.g. assigned different priorities. Depending on the situation the M2M device selects which data to transmit.

According to one aspect of the invention it further comprises delaying data until the at least one power parameter or the at least one link quality parameter changes.

According to one aspect of the invention it further comprises that the data has different priority level. The M2M device has knowledge about the priority of the data and thus choose high priority data first, if power level is getting low.

According to one aspect of the invention it further comprises predicting the amount of data traffic between the machine to machine devices based on active events that trigger transmission of data. In this application a simple form of the power optimization is disclosed. However, the algorithm may be made very complex. One example is predicting in the M2M device how much data will be sent in the future.

This estimation may be based on active events. It may also be based on historic amounts or any other parameter. The M2M device may also predict how much energy will be harvested in the near future.

According to one aspect of the invention it further comprises scheduling an "out of power" message for transmission to said mobile communications network indicating that the power level of the internal power source is below a predetermined level.

If the message indicates that power is low, but still enough to send some data, the eNodeB scheduler may utilize this information to optimize allocation of resources, in order to provide for a very low transmission power, wherein the remaining power will last longer.

In case of the energy harvesting device being completely out of power and entering a sleep mode, the network can remove the allocated resources from that specific device as long as the device does not have enough energy.

In the situation today, such a device will be deemed switched off, meaning that it will be completely detached. So, when the device comes back, there will be a signaling penalty associated with attach, followed by PDP context activation. However, using this proposal, the network will be able to mark the device as "non-functional", remove associated resources but still keeping the context, and associate them whenever the device comes back.

It is then possible to propose different sets of performance requirements for different classes of devices, such as, TRP/TRS for mobile phones versus notebook devices. (Ref 3GPP TS 25.144).

One embodiment of the method for power optimized transmission scheduling will now be described in further detail with reference to FIG. 4.

This method may e.g. be implemented in a transport system with containers each comprising a WWAN module for tracking the location, temperature etc. of each container.

The WWAN module typically comprises a battery and a network communication unit 21. It further comprises a solar panel for charging the battery when located outside. However, for long periods of time, the container may be placed e.g. in a storage without possibility of energy harvesting.

According to one aspect of the invention, the device comprises a number of programmed events. For example, it periodically report its location retrieved from a GPS module within the container. The GPS is either positioned within the container or within the WWAN device. According to one aspect of the invention data transmission is triggered when the temperature in the container is above or below a certain temperature.

In the first step 300, the container is passive and waits 300 for an event. Examples of events: sensor info, timer, BIST, transition to good radio conditions, sufficient harvested energy. When an event occurs 310, the container checks 311 if data transmission is required, e.g. due to changed conditions. If not, the container goes back to power save mode 312 and back to the initial state of waiting for an event 300.

If data transmission is needed the container estimates the energy required to transmit data using the current Radio Access Technology and radio conditions 314.

Then the container checks if the current harvested and stored energy is sufficient 320a. If not, the container waits until harvested energy is sufficient 321. When harvested energy is sufficient, the container goes back to step 311 and checks if there is still a need to send data. If not, it will go back to power save mode again 312.

If energy is sufficient, the container checks if the radio conditions are good 320b. If not, the container checks periodically for better radio conditions 321b. When radio conditions improve, then it goes back to step 311 and checks if there is still a need to send data. If not, it will go back to power save mode again 312.

If radio conditions are good the container will schedule the data for immediate transmission to the network 340. Hence, the decision to send 340 is based on the monitoring 320a and 320b. After transmission the container will recalculate energy level 350. In the next step 360, the container checks if the energy stored in the battery is less than a minimum threshold. If not, the transmission is complete and the container goes back to power save mode 361 and waits for the next event 300. However, if the stored energy is now below a predefined threshold, indicating that the stored energy level is getting low, the container sends an "Out Of Power" message indicating that the device will be forced to shut down indefinitely until sufficient energy has been harvested 370. The network is then allowed to free the resources allocated to the container. However, it may store the settings such that the same IP address may be used when the container signals that it wants to reconnect. The container then waits for harvested energy to be sufficient to reconnect 371. Then the container reconnects to the network 372 and goes back to power save mode 373 and waits for an event 300.

It should be noted that this is just an exemplary embodiment. The main principle of the invention is the intelligence of the M2M device to control its energy usage based on the present conditions. This may be implemented in many different ways.

Figure 5:
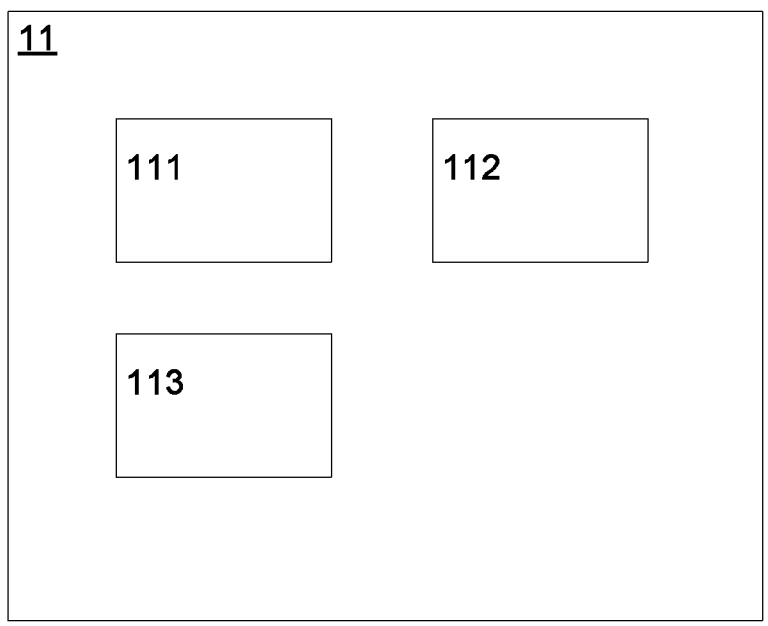
FIG. 5 discloses a network node.

FIG. 5 discloses a network node 11 in a mobile communications system 10. The network node comprises a network communication unit 111, an internal data storage 112 and a processor unit 113.

The network communication unit 111 is configured to communicate with a mobile communication network 10 over a wireless link.

The internal data storage 112 is configured to store a classification of a device communicating with said mobile communication network 10.

The processor unit 113 is configured to receive a signal from an attached device using said network communication unit 111. The signal comprises a classification of the device as being an energy harvesting machine to machine device and storing said classification in the internal data storage 112.

ABBREVIATIONS

BER Bit Error Rate
BIST Built In Self Test
CV_BEP Coefficient of Variance of the Bit Error Probability
M2M Machine to machine
Mean_BEP Mean Bit Error Probability
PDP context Packet Data Protocol context
RSSI Received Signal Strength Indicator
Rx_Qual Received quality
RSCP Received Signal Code Power
RSRP Reference Signal Received Power
RSRQ Reference Signal Received Quality
SNR Signal to Noise Ratio
SINR Signal to Interference Ratio
WLAN Wireless Local Area Network
WPAN Wireless Personal Area Network
WWAN Wireless Wide Area Network
CQI Channel Quality Indicator

The invention claimed is:

1. A method for power optimized transmission scheduling in an energy harvesting machine to machine device, said machine to machine device comprising an internal power storage and an internal energy harvesting source and being configured for communication with a mobile communications network via a wireless link, said method comprising:
   receiving, in said machine to machine device, an event triggering a decision to send data to the mobile communications network;
   monitoring, in said machine to machine device, at least one power parameter of said internal power storage and at least one link quality parameter of said wireless link, the at least one power parameter including a prediction of an amount of energy to be harvested in a subsequent time interval; and
   scheduling said data for transmission based on the at least one power parameter and said at least one link quality parameter of said wireless link.

2. The method for power optimized transmission scheduling of claim 1, further comprising:
   scheduling network signalling data for transmission based on at least one of the at least one link quality and said at least one power parameter.

3. The method for power optimized transmission scheduling of claim 1, wherein scheduling said data comprises delaying data until the one of the at least one power parameter and the at least one link quality parameter changes.

4. The method for power optimized transmission scheduling of claim 1, wherein said scheduling is based on the present transmission capacity calculated using said at least one link quality and said at least one power parameter.

5. The method for power optimized transmission scheduling of claim 4, further comprising:
   scheduling network signalling data for transmission based on at least one of the at least one link quality and said at least one power parameter.

6. The method for power optimized transmission scheduling of claim 1, further comprising:
   transmitting a signal to said mobile communication network, said signal comprising a parameter defining said machine to machine device as being an energy harvesting machine to machine device.

7. The method for power optimized transmission scheduling of claim 1, further comprising:
   predicting the amount of data traffic between the machine to machine devices based on active events that are configured to trigger transmission of data.

8. The method for power optimized transmission scheduling of claim 1, wherein said scheduling is based on the present transmission capacity calculated using said at least one link quality and said at least one power parameter.

9. The method for power optimized transmission scheduling of claim 1, further comprising:
   transmitting a signal to said mobile communication network, said signal comprising a parameter defining said machine to machine device as being an energy harvesting machine to machine device.

10. The method for power optimized transmission scheduling of claim 1, wherein scheduling said data comprises one of discarding and delaying data.

11. The method for power optimized transmission scheduling of claim 1, wherein said data has different priority levels.

12. The method for power optimized transmission scheduling of claim 1, further comprising:
   predicting the amount of data traffic between the machine to machine devices based on active events that are configured to trigger transmission of data.

13. The method for power optimized transmission scheduling of claim 1, further comprising:
   scheduling an "out of power" message for transmission to said mobile communications network indicating that the power level of the internal power source is below a predetermined level.

14. The method for power optimized transmission scheduling of claim 1, wherein the at least one power parameter represents at least one of the following: power storage level, current power consumption and power storage leakage.

15. The method for power optimized transmission scheduling of claim 1, wherein the at least one link quality parameter represents at least one of the following: Serving Cell Signal to Noise Ratio, Serving Cell Received Signal Strength Indicator, Timing Advance, neighbor cell information, device motion, topography and cell conditions.

16. A machine to machine device comprising:
a network communication unit configured to communicate with a mobile communication network over a wireless link;
an internal power storage;
an internal energy harvesting source;
at least one monitor configured to monitor at least one power parameter of said internal power storage, the at least one power parameter including a prediction of an amount of energy to be harvested in a subsequent time interval; and
a processor unit configured to:
  receive an event triggering a decision to send data to the mobile communications network; and
  schedule said data for transmission to the mobile communication network based on the at least one power parameter of said internal power storage and based on at least one link quality parameter of said wireless link; and
  monitor, in said machine to machine device, the at least one link quality parameter of said wireless link.

17. A non-transitory computer program product comprising instructions that, when executed by a processing unit in a machine to machine device having an internal power storage and an internal energy harvesting source and being configured for communication with a mobile communications network via a wireless link, causes the machine to machine device to perform a method comprising:
  receiving, in said machine to machine device, an event triggering a decision to send data to the mobile communications network;
  monitoring, in said machine to machine device, at least one power parameter of said internal power source, the at least one power parameter including a prediction of an amount of energy to be harvested in a subsequent time interval; and
  scheduling said data for transmission based on the at least one power parameter and based on at least one link quality parameter of said wireless link; and
  monitoring, in said machine to machine device, at least one link quality parameter of said wireless link.

* * * * *